US012808434B2

(12) United States Patent
Yamanaka et al.

(10) Patent No.: US 12,808,434 B2
(45) Date of Patent: Nov. 24, 2026

(54) VEHICLE DRIVE DEVICE

(71) Applicant: AISIN CORPORATION, Kariya (JP)

(72) Inventors: Sho Yamanaka, Kariya (JP); Takemi Tamura, Kariya (JP); Yuki Kawamoto, Kariya (JP); Keisuke Yamada, Kariya (JP)

(73) Assignee: AISIN CORPORATION, Kariya (JP)

( * ) Notice: Subject to any disclaimer, the term of this patent is extended or adjusted under 35 U.S.C. 154(b) by 253 days.

(21) Appl. No.: 18/705,236

(22) PCT Filed: Feb. 3, 2023

(86) PCT No.: PCT/JP2023/003570
§ 371 (c)(1),
(2) Date: Apr. 26, 2024

(87) PCT Pub. No.: WO2023/153329
PCT Pub. Date: Aug. 17, 2023

(65) Prior Publication Data
US 2026/0132846 A1 May 14, 2026

(30) Foreign Application Priority Data
Feb. 10, 2022 (JP) ................................ 2022-019677

(51) Int. Cl.
*F16H 57/04* (2010.01)
*F16H 57/02* (2012.01)
*F16H 57/021* (2012.01)

(52) U.S. Cl.
CPC ..... *F16H 57/0443* (2013.01); *F16H 57/0424* (2013.01); *F16H 57/0476* (2013.01); *F16H 2057/02034* (2013.01); *F16H 57/021* (2013.01)

(58) Field of Classification Search
CPC ............... F16H 57/021; F16H 57/0424; F16H 57/0443; F16H 57/0476; F16H 2057/02034
See application file for complete search history.

(56) References Cited

U.S. PATENT DOCUMENTS 5,176,039 A * 1/1993 Takeuchi ........... F16H 57/0447 74/606 R
7,182,109 B2 2/2007 Kolberg
(Continued)

FOREIGN PATENT DOCUMENTS

DE 10 2011 082 185 A1 3/2013
DE 10 2014 204 088 A1 9/2015
(Continued)

OTHER PUBLICATIONS

Mar. 14, 2023 International Search Report issued in International Patent Application No. PCT/JP2023/003570.
(Continued)

*Primary Examiner* — Minh Truong
(74) *Attorney, Agent, or Firm* — Oliff PLC

(57) ABSTRACT

A rotary electric machine and a gear mechanism are housed in a case including a first housing chamber and a second housing chamber separated by a partition wall. The gear mechanism supplies oil to a lubrication target location by scooping up the oil inside the case. A valve body that allows an oil flow from the first housing chamber to the second housing chamber and restricts an oil flow from the second housing chamber to the first housing chamber is attached to an opening that is formed by the partition wall and communicates the first housing chamber and the second housing chamber.

8 Claims, 7 Drawing Sheets

(56) References Cited

U.S. PATENT DOCUMENTS

| | | | | |
|---|---|---|---|---|
| 7,982,346 | B2 * | 7/2011 | Mogi | B60K 17/12<br>310/58 |
| 11,781,643 | B2 * | 10/2023 | Fujimoto | F16H 57/045<br>184/6.12 |
| 2006/0185761 | A1 | 8/2006 | Kolberg | |
| 2011/0120805 | A1 * | 5/2011 | Michel | F16H 57/0443<br>184/106 |
| 2012/0217079 | A1 * | 8/2012 | Besler | B60B 35/16<br>403/361 |
| 2017/0114886 | A1 * | 4/2017 | Matsushita | F16H 57/0443 |
| 2020/0300353 | A1 | 9/2020 | Ishikawa et al. | |
| 2022/0268351 | A1 | 8/2022 | Ishikawa et al. | |
| 2022/0282781 | A1 * | 9/2022 | Nakata | F16H 57/0424 |
| 2023/0304571 | A1 * | 9/2023 | Fujikawa | F16H 57/0483 |

FOREIGN PATENT DOCUMENTS

| | | | |
|---|---|---|---|
| JP | S51-45760 | U | 4/1976 |
| JP | S54-9731 | Y2 | 5/1979 |
| JP | S55-24508 | U | 2/1980 |
| JP | S62-163658 | U | 10/1987 |
| JP | 2003-169448 | A | 6/2003 |
| JP | 2006-206042 | A | 8/2006 |
| JP | 2008-089016 | A | 4/2008 |
| JP | 2020-156296 | A | 9/2020 |
| WO | 2024/074203 | A1 | 4/2024 |

OTHER PUBLICATIONS

Feb. 20, 2025 Extended Search Report issued in European Patent Application No. 23752794.0.

* cited by examiner

VEHICLE DRIVE DEVICE

TECHNICAL FIELD

The present disclosure relates to a vehicle drive device including a case that houses a rotary electric machine that is a driving force source for wheels and a gear mechanism.

BACKGROUND ART

Japanese Unexamined Patent Application Publication No. 2020-156296 (JP 2020-156296 A) discloses a vehicle drive device (1) in which oil for lubricating (including cooling) a rotary electric machine (2) and gear mechanisms (4,5) is housed inside a case (1) that houses them (signs in parentheses in the section "BACKGROUND ART" are those in the referenced document). The oil is stored in an oil reservoir (P) inside the case (6), and part of the gears of the gear mechanisms (4, 5) scoops up the oil stored in the oil reservoir (P) to supply the oil to bearings and a stator core (32) of the rotary electric machine (2) via a catch tank and oil passages formed inside the case (6). The internal space of the case (6) is partitioned by a partition wall (61c) into a first housing chamber (81) that houses the rotary electric machine and a second housing chamber (82) that houses the gear mechanisms. The partition wall (61c) has an opening (68) that communicates the two housing chambers (81, 82). The oil can flow between the first housing chamber (81) and the second housing chamber (82) through the opening (68).

RELATED ART DOCUMENTS

Patent Documents

Patent Document 1: Japanese Unexamined Patent Application Publication No. 2020-156296 (JP 2020-156296 A)

SUMMARY OF THE DISCLOSURE

Problem to be Solved by the Disclosure

When the oil can flow between the two housing chambers as described above, the oil may be biased toward one of the housing chambers due to tilt of the vehicle or inertia caused along with turn of the vehicle, an acceleration, etc. For example, when the oil is biased toward the first housing chamber (81) and the amount of oil in the second housing chamber (82) decreases, the amount of oil scooped up by the gear decreases, and the oil supply via the catch tank and the oil passages may be insufficient. In a case where an oil pump is housed in the first housing chamber (81), the suction of oil by the oil pump may be insufficient when the oil is biased toward the second housing chamber (82) and the amount of oil in the first housing chamber (81) decreases. If the oil flow between the two housing chambers is blocked and the housing chambers store oil independently, drain holes are required in the respective housing chambers for replacement of oil etc. Thus, the structure of the case may be complicated.

In view of the above background, it is desirable to provide a vehicle drive device in which the bias of oil toward any one of a plurality of housing chambers formed in a case is suppressed.

Means for Solving the Problem

In view of the above problems, a vehicle drive device includes: a rotary electric machine that is a driving force source for a wheel; an output member drivingly connected to the wheel; a gear mechanism that drivingly connects the rotary electric machine and the output member; and a case that houses the rotary electric machine and the gear mechanism. The case is partitioned by a partition wall of the case to include a first housing chamber that houses the rotary electric machine and a second housing chamber that houses the gear mechanism. The gear mechanism supplies oil to a lubrication target location by scooping up the oil inside the case. The partition wall has an opening that communicates the first housing chamber and the second housing chamber. A valve body is attached to the opening so as to allow an oil flow from the first housing chamber to the second housing chamber and restrict an oil flow from the second housing chamber to the first housing chamber.

In this configuration, the partition wall that separates the first housing chamber and the second housing chamber has the opening that communicates the first housing chamber and the second housing chamber, and the valve body is attached to the opening so as to allow the oil flow from the first housing chamber to the second housing chamber and restrict the oil flow from the second housing chamber to the first housing chamber. Therefore, a decrease in the oil level in the second housing chamber can be limited even if the oil surface is tilted due to tilt of the vehicle or inertia caused by turn or acceleration and deceleration. That is, even if the oil surface is tilted, the gear mechanism housed in the second housing chamber can supply the oil to the lubrication target location by scooping up the oil inside the case. With this configuration, it is possible to provide the vehicle drive device in which the bias of the oil toward any one of the plurality of housing chambers formed in the case is suppressed.

Further features and advantages of the vehicle drive device will become apparent from the following description of an exemplary and non-limiting embodiment that will be given with reference to the drawings.

MODES FOR CARRYING OUT THE DISCLOSURE

Figure 1:
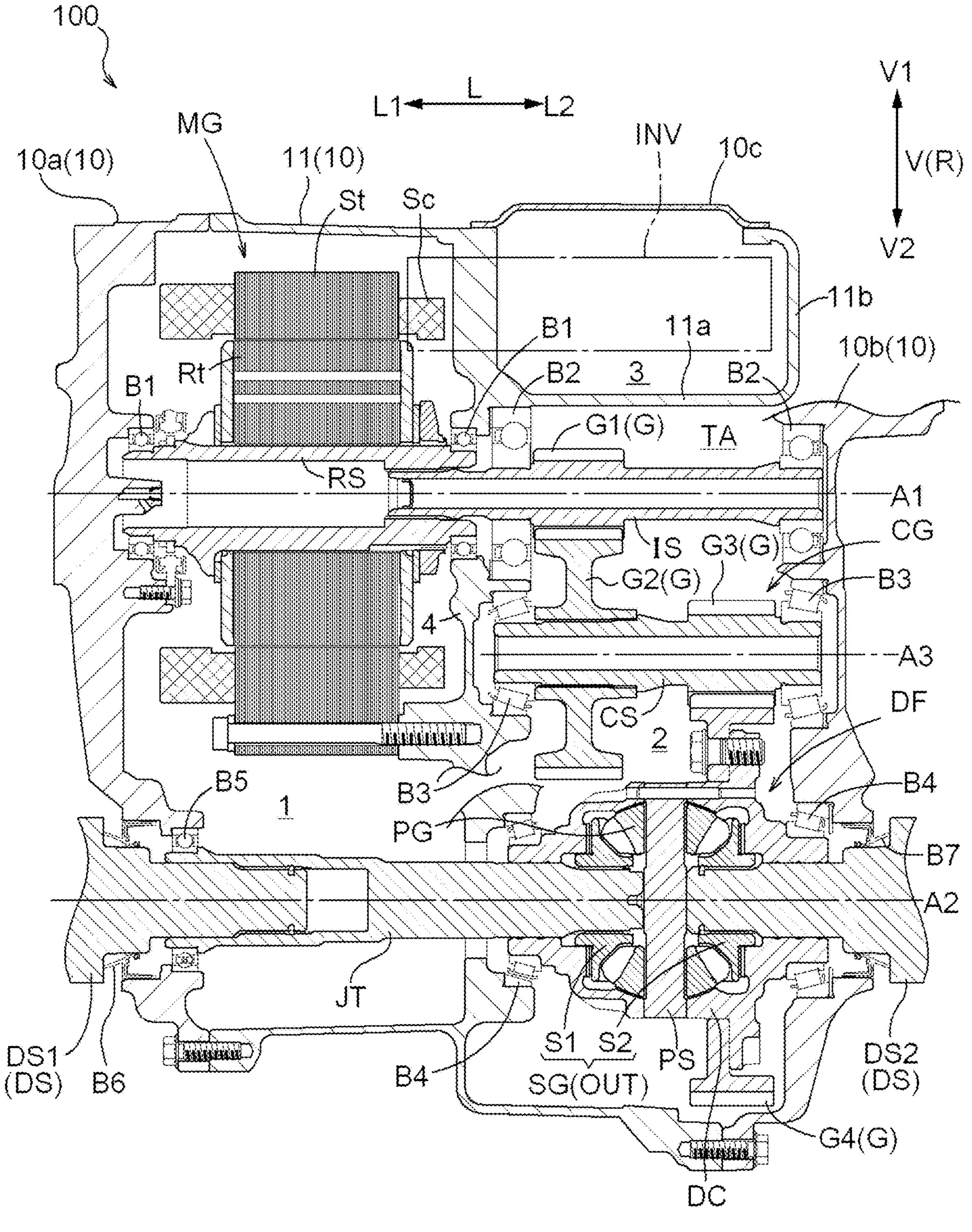
FIG. 1 is an axial sectional view of a vehicle drive device.
Figure 2:
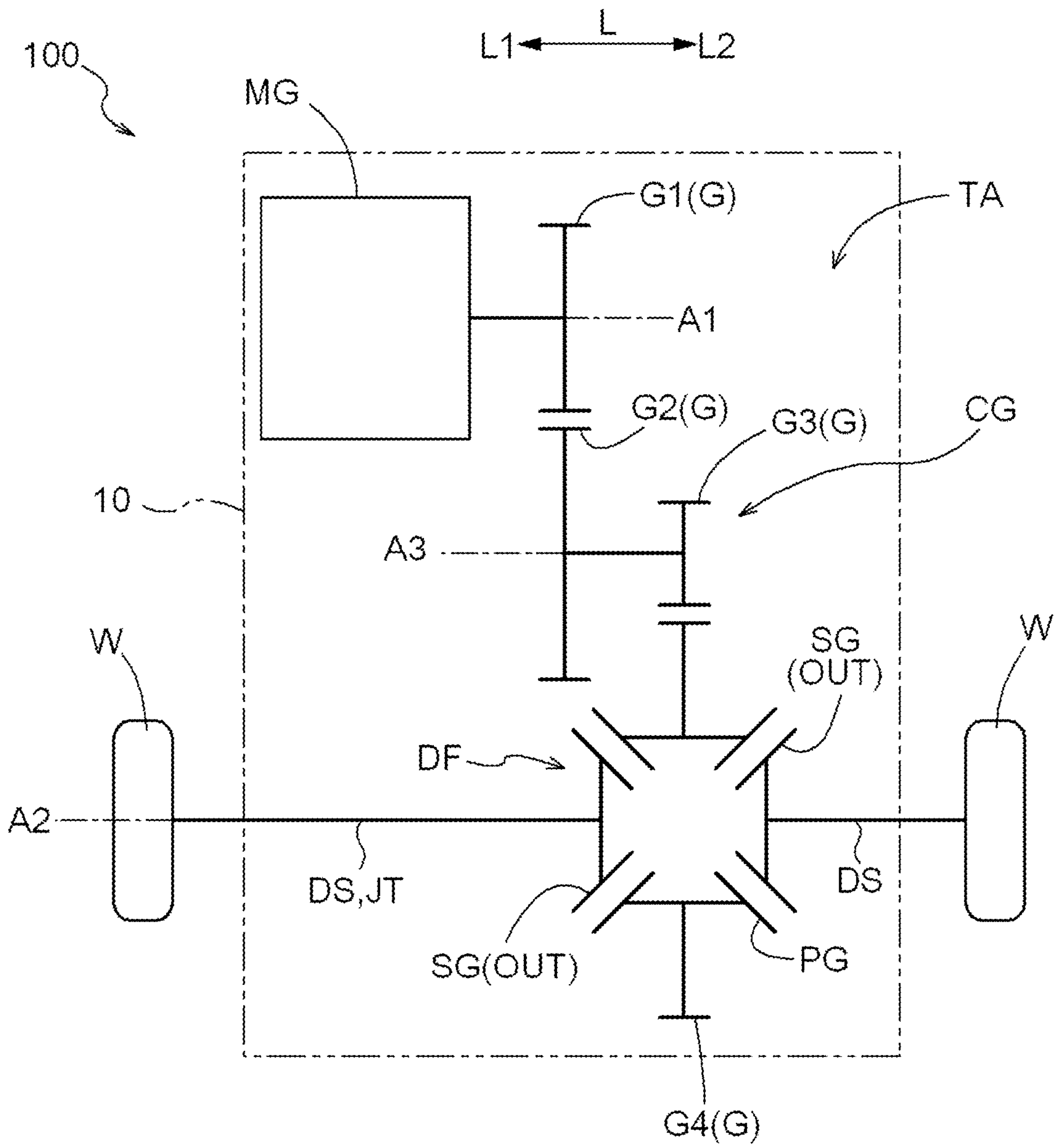
FIG. 2 is a skeleton diagram of the vehicle drive device.

Hereinafter, an embodiment of the present disclosure will be described with reference to the drawings. As shown in FIGS. 1 and 2, a vehicle drive device 100 according to the present embodiment includes a rotary electric machine MG that is a driving force source for wheels W, output members OUT drivingly connected to the wheels W, a gear mechanism TA that drivingly connects the rotary electric machine MG and the output members OUT, and a case 10 that houses the rotary electric machine MG and the gear mechanism TA. As shown in FIG. 1, the case 10 includes at least a first housing chamber 1 and a second housing chamber 2 separated by a partition wall 4 of the case 10. As described later, in the present embodiment, the first housing chamber 1 houses the rotary electric machine MG, and the second housing chamber 2 houses the gear mechanism TA. In the present embodiment, the case 10 also includes a third housing chamber 3 separated by a peripheral wall 11*a* from the first housing chamber 1 and the second housing chamber 2. The third housing chamber 3 houses an inverter INV that controls drive of the rotary electric machine MG.

As shown in FIGS. 1 and 2, the rotary electric machine MG is disposed on a first axis A1, and the output members OUT are disposed on a second axis A2 different from and parallel to the first axis A1. The gear mechanism TA is provided in a power transmission path between the rotary electric machine MG and the output members OUT, and includes a plurality of gears G that drivingly connects the rotary electric machine MG and the output members OUT. The plurality of gears G also includes gears G constituting a counter gear mechanism CG described later. The counter gear mechanism CG is disposed on a third axis A3 different from and parallel to the first axis A1 and the second axis A2. The gear mechanism TA also includes a differential gear mechanism DF that distributes, to the pair of wheels W, a driving force transmitted from the rotary electric machine MG via the plurality of gears G. Although details will be described later, a pair of output gears (side gears SG) of the differential gear mechanism DF corresponds to the output members OUT. In the present embodiment, the wheels W and the output members OUT are connected via output shafts DS. The output shafts DS can also be considered as the output members OUT. The pair of side gears SG of the differential gear mechanism DF can also be considered to correspond to the output members OUT and to be included in the gear mechanism TA.

In the present application, "drivingly connected" refers to a state in which two rotary elements are connected so that a driving force can be transmitted, and includes a state in which the two rotary elements are connected so as to rotate integrally or a state in which the two rotary elements are connected so that a driving force can be transmitted via one, two, or more transmission members. Such transmission members include various members that transmit rotation at the same speed or at a shifted speed, such as a shaft, a gear mechanism, a belt, and a chain. The transmission members may include an engagement device that selectively transmits rotation and a driving force, such as a friction engagement device and an intermesh engagement device.

Although details will be described later, as shown in FIG. 1, an input gear G1 is connected to a rotor Rt of the rotary electric machine MG so as to rotate integrally with the rotor Rt. In the present embodiment, the input gear G1 is formed integrally with an input shaft IS on an outer peripheral side of the input shaft IS that is connected to a rotor shaft RS of the rotor Rt so as to rotate integrally with the rotor shaft RS. The plurality of gears G constituting the gear mechanism TA also includes the input gear G1.

The first axis A1, the second axis A2, and the third axis A3 are imaginary axes different from each other, and are parallel to each other as described above. In the following description, a direction parallel to the first axis A1 will be referred to as "axial direction L". Since the first axis A1 and the second axis A2 are parallel to each other, the axial direction L is also parallel to the second axis A2. Since the third axis A3 is parallel to the first axis A1 and the second axis A2, the axial direction L is also parallel to the third axis A3. One side in the axial direction L (in the present embodiment, a side where the rotary electric machine MG is disposed with respect to the gear mechanism TA) will be referred to as "first axial side L1", and the opposite side will be referred to as "second axial side L2".

A direction orthogonal to each of the first axis A1, the second axis A2, and the third axis A3 will be referred to as "radial direction R" with respect to each axis. When it is not necessary to distinguish the axis to be used as a reference, or when the axis to be used as a reference is clear, the direction may be simply referred to as "radial direction R". A direction along the vertical direction when the vehicle drive device 100 is attached to the vehicle will be referred to as "up-down direction V". In the present embodiment, a first up-down side V1 that is one side in the up-down direction V is an upper side, and a second up-down side V2 that is the other side in the up-down direction V is a lower side. When the vehicle drive device 100 is attached to the vehicle in parallel to a horizontal plane, one direction of the radial direction R agrees with the up-down direction V.

A direction orthogonal to the axial direction L and the up-down direction V will be referred to as "width direction H". One side in the width direction H will be referred to as "first widthwise side H1", and the other side in the width direction H will be referred to as "second widthwise side H2". As with the up-down direction V, one direction of the radial direction R also agrees with the width direction H. In the following description, terms related to the direction, the position, etc. of each member represent concepts that include a state in which there is a difference due to a variation permissible in manufacturing. The direction of each member represents a direction of the member when mounted on the vehicle drive device 100. In the present embodiment, the width direction H corresponds to a longitudinal direction of the vehicle when the vehicle drive device 100 is attached to the vehicle.

In the present embodiment, the case 10 includes a case body 11 integrally molded to form the first housing chamber 1, the second housing chamber 2, and the third housing chamber 3. The term "integrally molded" refers to, for example, a unitary member made of a common material as a single die casting. As a matter of course, the case body 11 may be composed of a plurality of members. In addition to the case body 11, the case 10 includes a first cover 10*a* joined to the case body 11 from the first axial side L1, a second cover 10*b* joined to the case body 11 from the second axial side L2, and a third cover 10*c* joined to the case body 11 from the first up-down side V1. The third housing chamber 3 is substantially formed as a space separated from the first housing chamber 1 and the second housing chamber 2 on the second axial side L2 with respect to the first housing chamber 1 and on the first up-down side V1 with respect to the second housing chamber 2.

Figure 3:
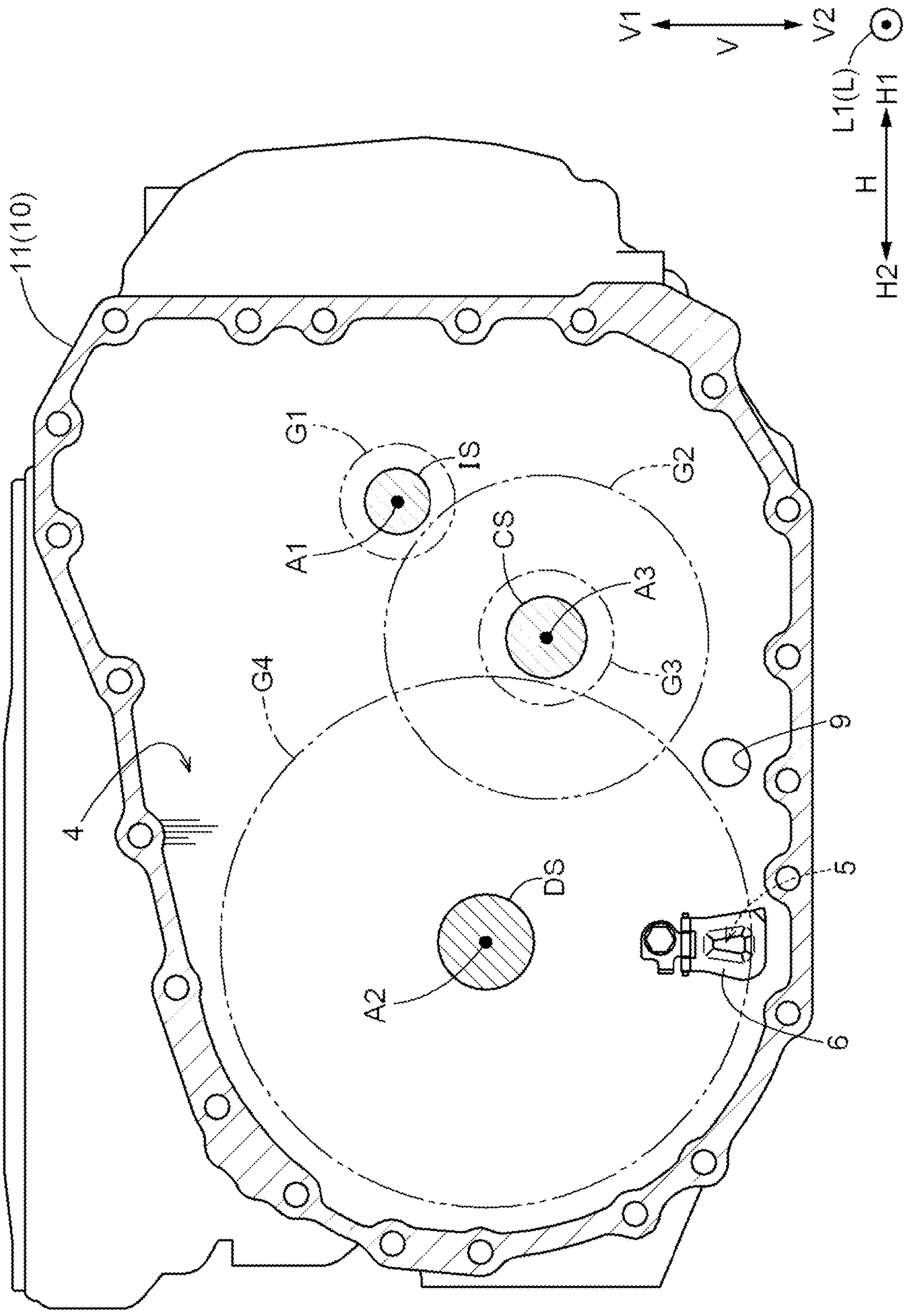
FIG. 3 is a plan view of a case body that is viewed from a second housing chamber side.
Figure 8:
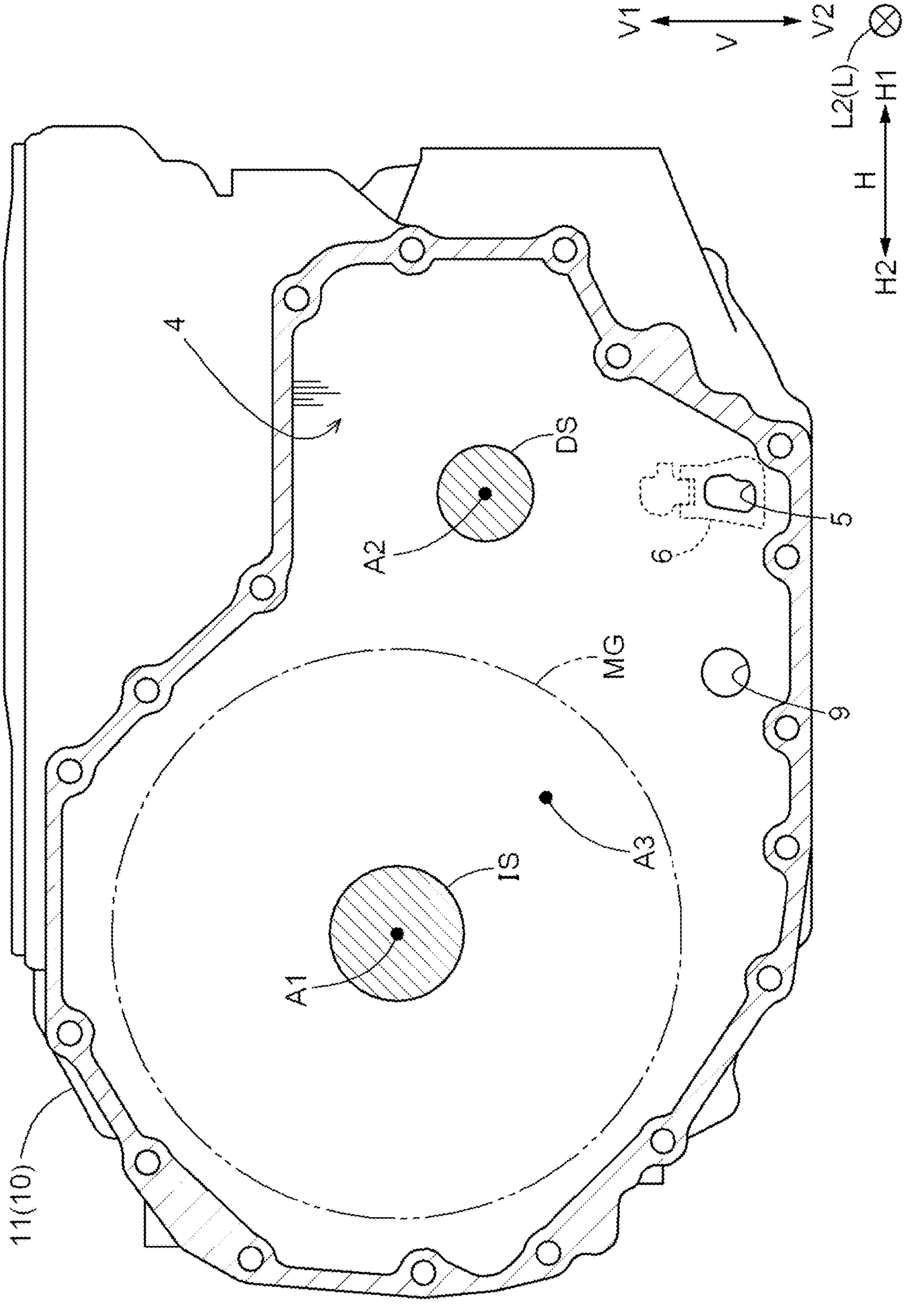
FIG. 8 is a plan view of the case body that is viewed from a first housing chamber side.

The partition wall 4 that extends along the up-down direction V and the width direction H and separates the first housing chamber 1 and the second housing chamber 2 is formed inside the case 10, specifically, inside the tubular case body 11 (see FIGS. 1, 3, 8, etc.). The partition wall 4 separates the first housing chamber 1 and the second housing chamber 2 in the axial direction L. The first housing chamber 1 is formed as a space enclosed by the case body 11, the first cover 10*a*, and the partition wall 4. The second housing chamber 2 is formed as a space enclosed by the case body 11, the second cover 10*b*, and the partition wall 4. The third housing chamber 3 is formed as a space enclosed by the peripheral wall 11*a* of the tubular case body 11 on the first up-down side V1 with respect to the second housing chamber 2, a side wall 11*b* provided upright from the peripheral wall 11*a* to the first up-down side V1, and the third cover 10*c*.

The rotary electric machine MG is a rotary electric machine (motor/generator) that operates by multi-phase alternating current (e.g., three-phase alternating current), and can function as both an electric motor and a generator. The rotary electric machine MG is supplied with electric power from a direct current power supply (not shown) to perform power running, or supplies (regenerates) electric power generated by the inertial force of the vehicle to the direct current power supply. As shown in FIG. 1, the rotary electric machine MG includes a stator St fixed to the case 10, and the rotor Rt rotatably supported on an inner side of the stator St in the radial direction R. The stator St includes a stator core and a stator coil Sc wound around the stator core, and the rotor Rt includes a rotor core and permanent magnets disposed in the rotor core.

The rotor Rt of the rotary electric machine MG is connected to the rotor shaft RS, the rotor shaft RS is connected to the input shaft IS, and the input gear G1 is integrally formed on an outer side of the input shaft IS in the radial direction R. As a matter of course, the input gear G1 may be formed as a member separate from the input shaft IS and connected to the input shaft IS. That is, the rotor Rt is drivingly connected to the input gear G1 via the rotor shaft RS and the input shaft IS, and the input gear G1 rotates integrally with the rotor Rt. As described later, the input gear G1 is drivingly connected to the counter gear mechanism CG. The rotor shaft RS is supported by a pair of first bearings B1 so as to be rotatable relative to the case 10, and the input shaft IS is supported by a pair of second bearings B2 so as to be rotatable relative to the case 10. The pair of first bearings B1 is supported by the first cover 10*a* and the partition wall 4. The pair of second bearings B2 is supported by the partition wall 4 and the second cover 10*b*.

The counter gear mechanism CG is disposed on the third axis A3 parallel to the first axis A1 and the second axis A2, and drivingly connects the rotary electric machine MG and the differential gear mechanism DF via the input gear G1. In the present embodiment, the counter gear mechanism CG includes two gears (first counter gear G2 and second counter gear G3) connected by a shaft member (counter shaft CS). That is, the counter gear mechanism CG includes the first counter gear G2 that is disposed on the third axis A3 and meshes with the input gear G1, and the second counter gear G3 that rotates integrally with the first counter gear G2 and meshes with a differential input gear G4 of the differential gear mechanism DF described later. The counter shaft CS is supported by a pair of third bearings B3 so as to be rotatable relative to the case 10. The third bearings B3 are supported by the partition wall 4 and the second cover 10*b*.

The differential gear mechanism DF includes a differential case DC, a pair of pinion gears PG, and the pair of side gears SG. The pair of pinion gears PG and the pair of side gears SG are bevel gears, and the differential gear mechanism DF of the present embodiment is a bevel gear type differential gear mechanism. As a matter of course, the differential gear mechanism DF may have a different configuration and may be, for example, a planetary gear type differential gear mechanism. The differential case DC is a hollow member that houses the pair of pinion gears PG and the pair of side gears SG. In the present embodiment, the differential case DC is supported by a pair of fourth bearings B4 so as to be rotatable relative to the case 10. In the present embodiment, the pair of fourth bearings B4 is supported by the partition wall 4 and the second cover 10*b*.

The differential case DC and the differential input gear G4 are connected so as to rotate integrally with each other. The pair of pinion gears PG is disposed so as to face each other with a distance in the radial direction R with respect to the second axis A2. A pinion shaft PS is supported on the differential case DC so as to rotate integrally with the differential case DC, and the pair of pinion gears PG is attached to the pinion shaft PS. The pair of pinion gears PG is rotatable (spinnable) about the pinion shaft PS and rotatable (revolvable) about the second axis A2. The pair of side gears SG meshes with the pair of pinion gears PG. The pair of side gears SG is disposed so as to face each other across the pinion shaft PS with a distance in the axial direction L and so as to rotate about the second axis A2 as a rotation axis.

The side gears SG are drivingly connected to the pair of output shafts DS, and the output shafts DS are drivingly connected to the pair of wheels W. In the present embodiment, a first side gear S1 that is one of the pair of side gears SG is connected to a connecting shaft JT, the connecting shaft JT is connected to a first output shaft DS1 that is one of the pair of output shafts DS, and the first output shaft DS1 is connected to one of the pair of wheels W. The connecting shaft JT is connected to the first side gear S1 on one end side so as to rotate integrally with the first side gear S1, extends in the axial direction L inside the first housing chamber 1, and is supported on the other end side by a fifth bearing B5 supported by the first cover 10*a* forming the first housing chamber 1 so as to be rotatable relative to the case 10. The first output shaft DS1 is connected to the connecting shaft JT on one end side so as to rotate integrally with the connecting shaft JT, and is supported by a member (not shown) inside the vehicle on the other end side. A first seal member B6 supported by the first cover 10*a* is provided on the other end side of the first output shaft DS1. A second side gear S2 that is the other of the pair of side gears SG is connected to a second output shaft DS2 that is the other of the pair of output shafts DS, and the second output shaft DS2 is connected to the other of the pair of wheels W. The second output shaft DS2 is connected to the second side gear S2 on one end side so as to rotate integrally with the second side gear S2, and is supported by a member (not shown) inside the vehicle on the other end side. A second seal member B7 supported by the second cover 10*b* forming the second housing chamber 2 is provided on the other end side of the second output shaft DS2.

In this way, the differential gear mechanism DF distributes, to the pair of side gears SG serving as the output members OUT, a torque transmitted from the rotor Rt via the input gear G1, the counter gear mechanism CG (first counter gear G2 and second counter gear G3), and the differential input gear G4, and transmits the driving force to the pair of wheels W. Thus, the vehicle drive device 100 can transmit the torque of the rotary electric machine MG to the wheels W to cause the vehicle to travel. In addition to the side gears SG and the output shafts DS, the connecting shaft JT can also be considered as the output member OUT.

The rotary electric machine MG and the gear mechanism TA constituting the vehicle drive device 100 are lubricated (including cooling) with oil. Specifically, the bearings (B1 to B5), the seal members (B6, B7), the stator coil Sc of the rotary electric machine MG, etc. described above (collectively referred to as "lubrication target locations") are lubricated and cooled with oil. The lubricating oil is supplied to the vehicle drive device 100 from at least one of a mechanical oil pump (not shown) driven by one or more of the driving force sources for the wheels W (including the rotary electric machine MG described above and an internal combustion engine in a case where the internal combustion engine etc. is provided separately) and an electric oil pump (not shown) driven by a driving force source different from the driving force sources for the wheels W (e.g., a rotary electric machine (motor) different from the rotary electric machine MG). The vehicle drive device 100 has oil passages that reach the lubrication target locations, and the oil is supplied from the oil pump. If the oil passages from the oil pump are formed for all the lubrication target locations, however, the oil passages may be complicated and the size of the vehicle drive device 100 may increase. When the number of oil passages increases, it may be necessary to increase the discharge performance of the oil pump.

Therefore, in addition to the direct oil supply from the oil pump, part of the lubrication target locations in the vehicle drive device 100 (e.g., the stator coil Sc of the rotary electric machine MG in the present embodiment) is often supplied with the oil from the oil pump and the other lubrication target locations (e.g., the gears G and the bearings (B1 to B5) in the present embodiment) are often lubricated with the oil after the lubrication of the part of the lubrication target locations. The oil used for the lubrication falls by gravity and is stored inside the case 10 (oil reservoir located at the bottom of the case 10). The other lubrication target locations may be lubricated, for example, by scooping up the oil in the oil reservoir using rotary members such as various gears G in the vehicle drive device 100 or by blowing off the oil that falls on the rotary members such as the gears G using a centrifugal force. In the present embodiment, the first counter gear G2 and the differential input gear G4 are used as the rotary members that scoop up the oil from the oil reservoir at the bottom of the case 10. In the present embodiment, the differential input gear G4 having the tooth flanks located furthest on the second up-down side V2 mainly functions as the scooping gear G. That is, the gear mechanism TA scoops up the oil inside the case 10 to supply the oil to the lubrication target locations. In the present embodiment, the lubrication target locations to be lubricated by scooping up the oil using the gear mechanism TA (mainly the differential input gear G4) are the gears G constituting the gear mechanism TA and the bearings (B1 to B5).

As described above, in the present embodiment, the lubrication target locations are present in both the first housing chamber 1 and the second housing chamber 2. Therefore, the oil after the lubrication falls in the first housing chamber 1 and the second housing chamber 2 and accumulates at the bottoms of the chambers. The scooping gear G is disposed in the second housing chamber 2 as described above. The oil pump may be disposed in the first housing chamber 1. Therefore, it is preferable that the oil accumulate appropriately in the two housing chambers. In order that the oil can flow between the first housing chamber 1 and the second housing chamber 2, the partition wall 4 that separates the first housing chamber 1 and the second housing chamber 2 has an opening 5 that communicates the first housing chamber 1 and the second housing chamber 2 as shown in FIG. 3 etc. As shown in FIGS. 3 to 8, a valve body 6 is attached to the opening 5 so as to allow an oil flow from the first housing chamber 1 to the second housing chamber 2 and restrict an oil flow from the second housing chamber 2 to the first housing chamber 1.

Figure 4:
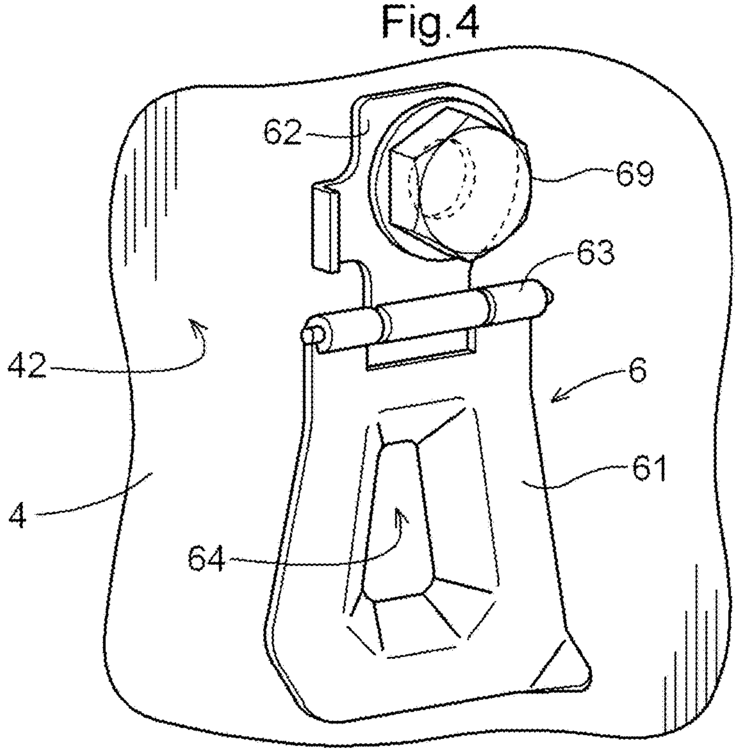
FIG. 4 is a perspective view showing an example of a valve body.

As shown in FIG. 4, the valve body 6 includes a plate 61, a fixed portion 62, a hinge portion 63, and a pyramidal portion 64. The plate 61 and the fixed portion 62 are connected via the hinge portion 63 so as to be swingable relative to each other. The fixed portion 62 is fixed to the partition wall 4 from the second housing chamber 2 side by a fastening member 69. Therefore, the valve body 6 is attached to the partition wall 4 so that the plate 61 swings with the fixed portion 62 and the hinge portion 63 fixed to a surface (attachment surface 42) of the partition wall 4 on the second housing chamber 2 side. The plate 61 has a larger area than the opening 5, and the pyramidal portion 64 is formed at the center of the plate 61. The pyramidal portion 64 is formed so as to protrude toward the first housing chamber 1 (protrude relative to a portion surrounding the center of the plate 61) with the valve body 6 attached to the partition wall 4.

Figure 5:
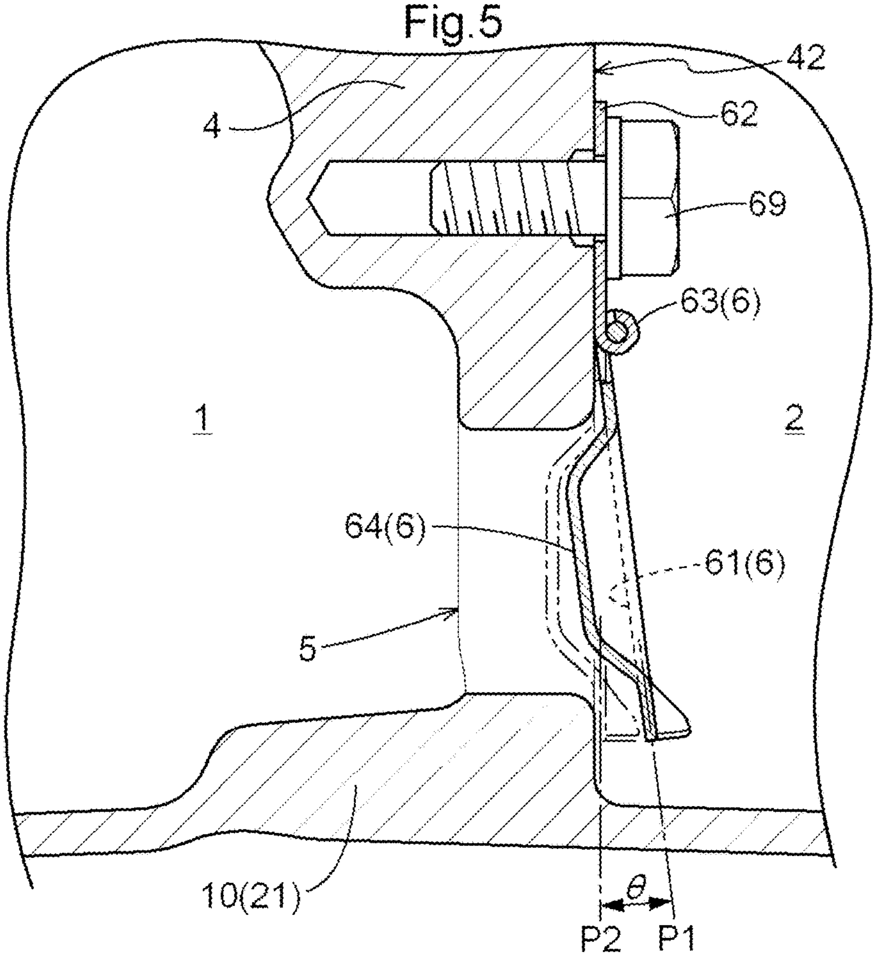
FIG. 5 is a partial sectional view of a partition wall, showing a relationship between an opening and the valve body.

As shown in FIG. 5, the valve body 6 has a posture in which the plate 61 is separated from the partition wall 4 (first posture P1) when the vehicle is not tilted but is horizontal, that is, when the vehicle drive device 100 has a horizontal posture. When the valve body 6 has the first posture P1, the opening 5 is not closed by the valve body 6 (plate 61 and pyramidal portion 64) as shown in FIG. 5, and the oil can freely flow between the first housing chamber 1 and the second housing chamber 2. That is, a bidirectional oil flow is allowed between the first housing chamber 1 and the second housing chamber 2.

In a posture in which the plate 61 is in contact with the partition wall 4 (second posture P2), the opening 5 is closed by the valve body 6 (plate 61 and pyramidal portion 64) as indicated by dashed lines in FIG. 5. When the oil is to flow from the second housing chamber 2 to the first housing chamber 1, the plate 61 is pushed toward the partition wall 4 by a fluid pressure. Thus, the oil flow from the second housing chamber 2 to the first housing chamber 1 is blocked by the valve body 6. When the oil is to flow from the first housing chamber 1 to the second housing chamber 2, the plate 61 is pushed away from the partition wall 4 by the fluid pressure. Thus, the opening 5 is opened when the fluid pressure exceeds the force for pushing the plate 61 against the partition wall 4. Therefore, the oil flow from the first housing chamber 1 to the second housing chamber 2 is not blocked by the valve body 6 and the oil flows. In the present embodiment, the angle (opening angle $\theta$) between the first posture P1 and the second posture P2 is about 5° to 10°.

As described above, the lubrication target locations in the vehicle drive device 100 are present in both the first housing chamber 1 and the second housing chamber 2. For example, the input gear G1, the first counter gear G2, the second counter gear G3, the first bearings B1, the second bearings B2, the third bearings B3, the fourth bearings B4, the fifth bearing B5, the first seal member B6, the second seal member B7, etc. can be lubricated via a catch tank and oil passages (not shown) by scooping up the oil using the differential input gear G4 from the oil reservoir at the bottom of the case 10, in particular, from the oil reservoir at the bottom of the second housing chamber 2. Similarly, the stator coil Sc of the rotary electric machine MG can be cooled via a catch tank or an oil passage (not shown). For example, the oil that has lubricated the first bearings B1 and the oil that has cooled the stator coil Sc fall into the first housing chamber 1 and are stored in the oil reservoir at the bottom of the first housing chamber 1. The oil stored in the first housing chamber 1 flows into the oil reservoir in the second housing chamber 2 via the opening 5 of the partition wall 4. As the oil circulates inside the case 10 in this way, the rotary electric machine MG and the gear mechanism TA continue to be lubricated appropriately.

Figure 7:
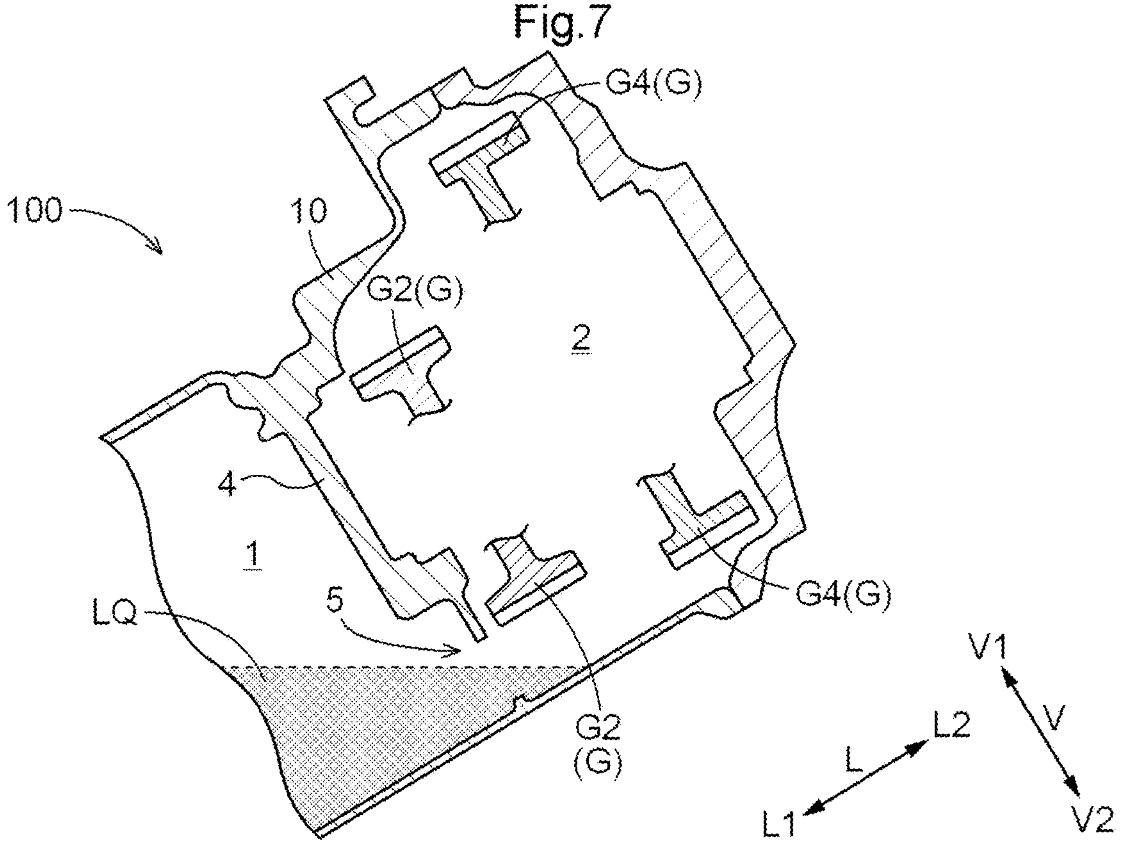
FIG. 7 is a diagram showing an example of the state of oil in a case when a vehicle drive device without a valve body at an opening is tilted.

When the oil can flow between the two housing chambers in this way, the oil may be biased toward one of the housing chambers due to tilt of the vehicle or inertia caused along with turn of the vehicle, an acceleration, etc. For example, when the oil is biased toward the first housing chamber 1 and the amount of oil in the second housing chamber 2 decreases as shown in FIG. 7, the amount of oil scooped up by the gear G decreases, and the oil supply to the lubrication target locations via the catch tank and the oil passages may be insufficient. In the example of FIG. 7, both the differential input gear G4 and the first counter gear G2 are located above the level of accumulated oil LQ and cannot scoop up the oil.

Figure 6:
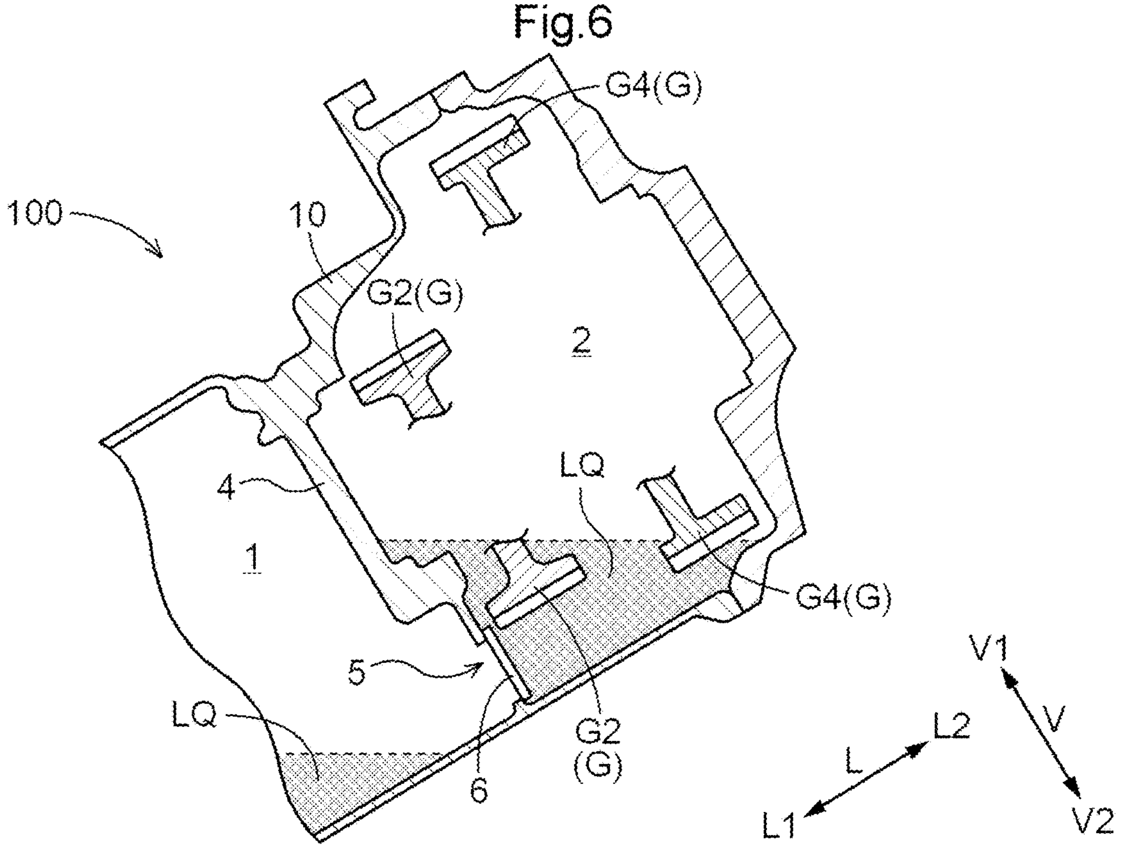
FIG. 6 is a diagram showing an example of the state of oil in a case when the vehicle drive device with the valve body at the opening is tilted.

In the present embodiment, however, the opening 5 is provided with the valve body 6 as described above. When the vehicle drive device 100 is tilted to the first axial side L1 as shown in FIG. 6, the opening 5 is closed by the valve body 6. Therefore, the oil flow from the second housing chamber 2 to the first housing chamber 1 is blocked, and the amount of oil flowing into the first housing chamber 1 is reduced. Thus, a sufficient amount of oil to be scooped up by the gear G remains in the second housing chamber 2. In the example shown in FIG. 6, part of the tooth flank of the differential input gear G4 and the entire tooth flank of the first counter gear G2 are immersed in the oil LQ accumulated in the second housing chamber 2. Therefore, in the example shown in FIG. 6, the oil can be scooped up by the differential input gear G4 and the first counter gear G2.

Since the valve body 6 is attached to the opening 5 formed in the partition wall 4 that separates the first housing chamber 1 and the second housing chamber 2 so as to allow the oil flow from the first housing chamber 1 to the second housing chamber 2 and restrict the oil flow from the second housing chamber 2 to the first housing chamber 1, a decrease in the oil level in the second housing chamber 2 can be limited even if the oil surface is tilted due to tilt of the vehicle or inertia caused by turn or acceleration and deceleration. By limiting the decrease in the oil level in the second housing chamber 2, the oil can appropriately be supplied to the lubrication target locations by scooping up the oil using the gear G.

As described above, in the present embodiment, the first housing chamber 1 houses the rotary electric machine MG, and the second housing chamber 2 houses the gear mechanism TA. According to the present embodiment, the decrease in the oil level in the second housing chamber 2 is suppressed even if the oil surface is tilted due to the tilt of the vehicle or the inertia caused by turn or acceleration and deceleration. For example, when the lubricating (cooling) oil is supplied to each part of the vehicle drive device 100 by scooping up the oil using the gear G in the gear mechanism TA housed in the second housing chamber 2, it is possible to reduce the occurrence of a case where the oil level decreases below the gear G and the gear G is hindered from scooping up the oil. That is, when the configuration of the present embodiment is applied to the configuration in which the gear mechanism TA is housed in the second housing chamber 2, each part can appropriately be lubricated by scooping up the oil using the gear G.

In the present embodiment, the vehicle drive device 100 includes an oil pump (not shown) (electric oil pump) that supplies the oil to the rotary electric machine MG, and a strainer (not shown) that removes impurities from the oil sucked by the oil pump. The strainer is housed in the second housing chamber 2. The oil pump is also housed in the second housing chamber 2. As shown in FIGS. 3 and 8, the partition wall 4 has a strainer disposition hole 9 in which the strainer that removes impurities from the oil sucked by the oil pump is disposed. Although illustration is omitted, a valve body may be disposed in the strainer disposition hole 9 as well.

The oil stored inside the case 10 deteriorates due to entry of dust generated by friction of the bearings etc., a change in composition (e.g., oxidation) caused by contact with a high-temperature member such as the stator coil Sc, etc. Since the lubrication performance and the cooling performance of the deteriorated oil decrease, the oil inside the case 10 is replaced periodically. Considering the possibility that the oil flow between the first housing chamber 1 and the second housing chamber 2 is limited by the valve body 6, a drain hole communicating with the first housing chamber 1 and a drain hole communicating with the second housing chamber 2 may be provided. In this case, the structure of the case 10 may be complicated and the costs may increase. When changing the oil, it is necessary to drain the oil from two locations. Therefore, the number of man-hours and the maintenance costs may increase.

Figure 9:
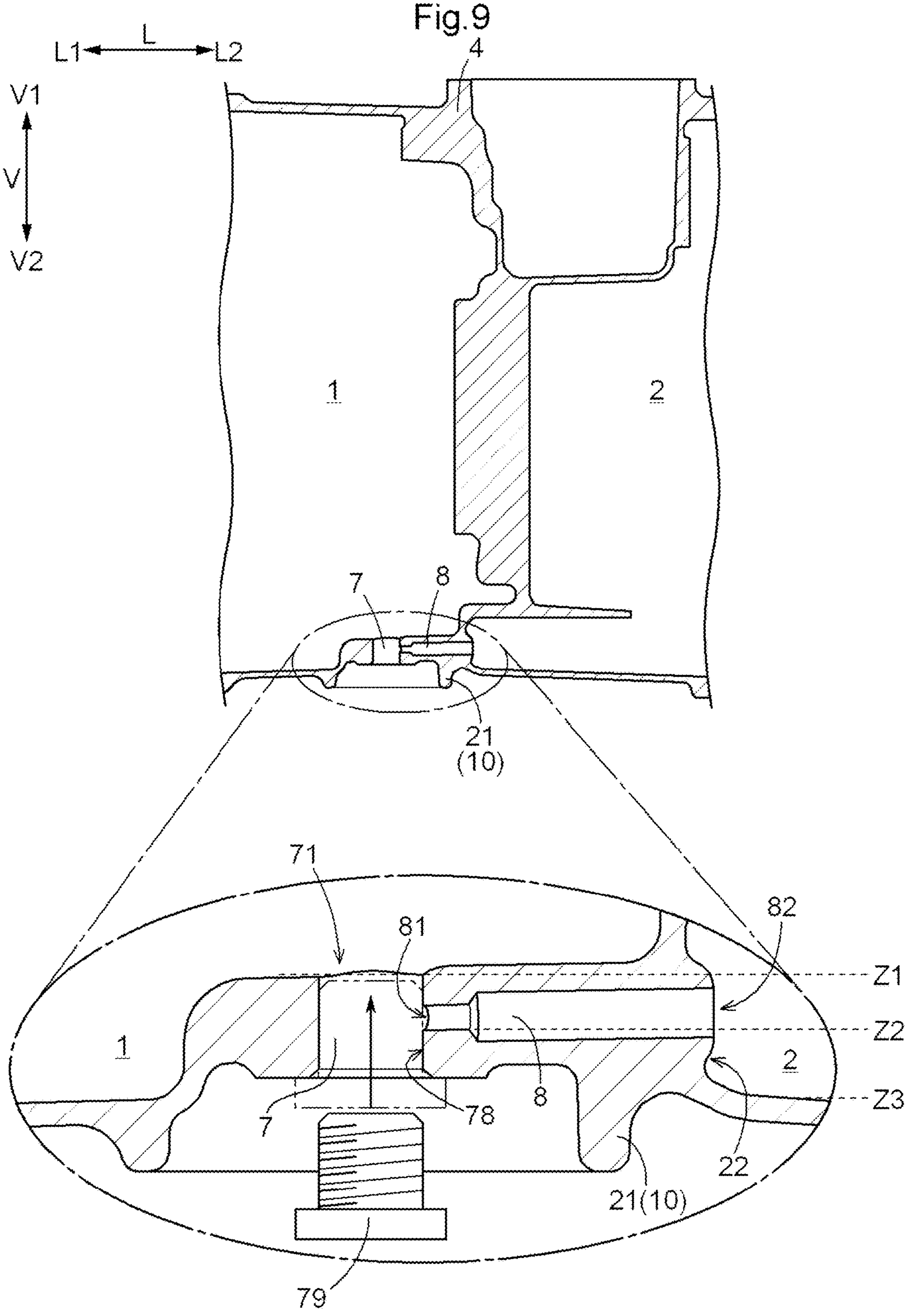
FIG. 9 is an axial sectional view showing an example of a drain hole and a communication hole.

In the present embodiment, as shown in FIG. 9, a bottom wall 21 of the first housing chamber 1 has a drain hole 7 that communicates the first housing chamber 1 and the outside of the case 10, and a communication hole 8 that communicates the second housing chamber 2 and the drain hole 7. A drain plug 79 is inserted into and removably fixed to the drain hole 7. By providing such a drain hole 7 and a communication hole 8, the oil housed in the first housing chamber 1 and the second housing chamber 2 can be drained from the single drain hole 7. Even if the valve body 6 is attached to the opening 5 as in the present embodiment, when draining the oil, the drain of the oil from the second housing chamber 2 is not hindered via the communication hole 8 that communicates the drain hole 7 and the second housing chamber 2. Compared to the case where the drain holes are provided in the first housing chamber 1 and the second housing chamber 2, the structure of the case 10 can be simplified and the number of components can be reduced. The drain hole 7 is closed by the drain plug 79, and the oil can be drained from both the first housing chamber 1 and the second housing chamber 2 by simply removing the single drain plug 79. Therefore, It is also possible to increase the efficiency of the oil draining work.

As shown in FIG. 9, the communication hole 8 is formed inside the bottom wall 21. Specifically, the communication hole 8 includes a first opening 81 that is open on the side surface of the drain hole 7, and a second opening 82 that is open on a facing surface of the bottom wall 21 that faces the second housing chamber 2 (second housing chamber facing surface 22). The communication hole 8 is formed so as to communicate the first opening 81 and the second opening 82. That is, the drain hole 7 and the communication hole 8 can be provided at low positions in the case 10 with the vehicle drive device 100 mounted on the vehicle. Therefore, the oil inside the case 10 can appropriately be drained via the drain hole 7.

As shown in FIG. 9, in the present embodiment, the position of the lower end of the first opening 81 (communication lower end position Z2) is located on a lower side (second up-down side V2) with respect to the position of the opening (drain opening 71) of the drain hole 7 on the first housing chamber 1 side (drain opening position Z1). With this configuration, the oil in the first housing chamber 1 is appropriately drained via the drain hole 7, and the oil in the second housing chamber 2 is appropriately drained via the drain hole 7 and the communication hole 8 connected to a side surface 78 of the drain hole 7 even if the oil flow toward the first housing chamber 1 via the opening 5 is restricted by the valve body 6. The lower end of the second opening 82 that is open on the second housing chamber facing surface 22 is located on the lower side with respect to the opening (drain opening 71) of the drain hole 7 on the first housing chamber 1 side. Therefore, the oil in the second housing chamber 2 can be drained until the oil level reaches the low position (communication lower end position Z2) in the communication hole 8.

If the opening 5 formed in the partition wall 4 is located at a lower position than that of the drain opening 71 that is the opening of the drain hole 7 on the first housing chamber 1 side, the oil flows into the second housing chamber 2 via the opening 5. The oil can be drained from the second housing chamber 2 via the communication hole 8 and the drain hole 7. It is preferable that the drain opening 71 be located at the lowest position in the first housing chamber 1. Even if such location is difficult, the oil in the first housing chamber 1 can be drained appropriately.

In the present embodiment, in a state in which the drain plug 79 is fixed to the drain hole 7 as indicated by dashed lines in FIG. 9, the drain hole 7 is closed and the communication between the first housing chamber 1 and the outside of the case 10 is blocked. Further, the communication between the second housing chamber 2 and the drain hole 7 via the communication hole 8 is blocked. That is, in the state in which the drain plug 79 is fixed to the drain hole 7, the communication between the first housing chamber 1 and the second housing chamber 2 via the communication hole 8 is blocked. Therefore, the oil flow between the first housing chamber 1 and the second housing chamber 2 via the communication hole 8 can be limited in the state in which the drain plug 79 is fixed to the drain hole 7.

Other Embodiments

Hereinafter, other embodiments will be described. The configuration of each embodiment described below is not limited to being applied alone, and can be applied in combination with the configurations of other embodiments as long as there is no contradiction.

(1) The above description exemplifies the vehicle drive device 100 having the three-axis configuration in which the three axes that are the first axis A1, the second axis A2, and the third axis A3 are parallel to each other. For example, the vehicle drive device 100 may have a two-axis configuration in which two axes that are the first axis A1 and the second axis A2 are parallel to each other. The vehicle drive device 100 may have a configuration in which one or more axes different from the first axis A1, the second axis A2, and the third axis A3 are further provided in parallel and therefore four or more axes are parallel to each other. The vehicle drive device 100 may have a single-axis configuration in which the rotary electric machine MG, the gears G, and the differential gear mechanism DF are disposed on the same axis.

(2) The above description exemplifies the vehicle drive device 100 including the rotary electric machine MG as the driving force source for the wheels W. The vehicle drive device 100 may be a hybrid drive device including both an internal combustion engine and the rotary electric machine MG as the driving force source for the wheels W of the vehicle (various types of hybrid drive device such as a so-called one-motor parallel type and a so-called two-motor split type).

(3) The above description exemplifies the form in which the first housing chamber 1 houses the rotary electric machine MG and the second housing chamber 2 houses the gear mechanism TA. However, the first housing chamber 1 may house the gear mechanism TA and the second housing chamber 2 may house the rotary electric machine MG. For example, the second housing chamber 2 may house the oil pump together with the rotary electric machine MG, and the valve body 6 that closes the opening 5 may be provided so that the oil pump can sufficiently suck the oil.

(4) The above description exemplifies the form in which the bottom wall 21 of the first housing chamber 1 has the second housing chamber facing surface 22, the second opening 82 of the communication hole 8 is open on the second housing chamber facing surface 22, and the communication hole 8 is formed inside the bottom wall 21. However, the partition wall 4 may be continuous with the bottom wall 21, the second opening 82 may be provided on the surface (attachment surface 42) of the partition wall 4 on the second housing chamber 2 side, and the communication hole 8 may be formed inside the partition wall 4 and the bottom wall 21.

(5) The above description exemplifies the form in which the position of the lower end of the first opening 81 (communication lower end position Z2) is located on the lower side (second up-down side V2) with respect to the position of the opening (drain opening 71) of the drain hole 7 on the first housing chamber 1 side (drain opening position Z1) (see FIG. 9). This is particularly useful when the position of the bottom of the second housing chamber 2 in the up-down direction V (second housing lowest position Z3) is lower than (on the second up-down side V2 with respect to) the position of the bottom of the first housing chamber 1 in the up-down direction V (in the example of FIG. 9, substantially equivalent to the drain opening position Z1). For example, more oil can be drained from the second housing chamber 2 than in the case where the oil is drained from the drain hole 7 by passing through the first housing chamber 1 from the second housing chamber 2 via the opening 5. However, the present disclosure is not limited to such a configuration. For example, when the position of the bottom of the second housing chamber 2 in the up-down direction V (second housing lowest position Z3) is higher than (on the first up-down side V1 with respect to) the position of the bottom of the first housing chamber 1 in the up-down direction V (drain opening position Z1), the position of the lower end of the first opening 81 (communication lower end position Z2) may be located on an upper side (first up-down side V1) with respect to the position of the opening (drain opening 71) of the drain hole 7 on the first housing chamber 1 side (drain opening position Z1).

(6) The above description exemplifies the form in which the communication between the first housing chamber 1 and the second housing chamber 2 via the communication hole 8 is blocked in the state in which the drain plug 79 is fixed to the drain hole 7. However, there is no prohibition on the form in which the first housing chamber 1 and the second housing chamber 2 communicate with each other via the communication hole 8 even in the state in which the drain plug 79 is fixed to the drain hole 7. The sectional area of the communication hole 8 is smaller than the opening area of the opening 5 of the partition wall 4. Further, the traveling vehicle often recovers from tilt or inertia in a relatively short period. Therefore, the amount of oil that flows from the second housing chamber 2 to the first housing chamber 1 through the communication hole 8 is often limited. Thus, the communication hole 8 need not be closed in the state in which the drain plug 79 is fixed to the drain hole 7.

(7) The above description exemplifies the form in which, as described above with reference to FIG. 9, the bottom wall 21 of the first housing chamber 1 has the drain hole 7 that communicates the first housing chamber 1 and the outside of the case 10, and the communication hole 8 that communicates the second housing chamber 2 and the drain hole 7. However, the present disclosure is not limited to this form, and a bottom wall (no reference numeral) of the second housing chamber 2 may have a drain hole (not shown) that communicates the first housing chamber 1 and the outside of the case 10. A drain plug is also inserted into and removably fixed to this drain hole. Since this drain hole is formed in the bottom wall of the second housing chamber 2, it communicates the first housing chamber 1 and the outside of the case 10, and also communicates the second housing chamber 2 and the outside of the case 10. That is, the bottom wall of the second housing chamber 2 has the drain hole that communicates the first housing chamber 1 and the outside of the case 10, and also communicates the second housing chamber 2 and the outside of the case 10. Thus, the oil inside the case 10 can appropriately be drained from the first housing chamber 1 and the second housing chamber 2 via the drain hole formed at a low position in the case 10 with the vehicle drive device 100 mounted on the vehicle.

(8) The above description exemplifies the form in which, as described above with reference to FIG. 9, the bottom wall 21 of the first housing chamber 1 has the drain hole 7 that communicates the first housing chamber 1 and the outside of the case 10, and the communication hole 8 that communicates the second housing chamber 2 and the drain hole 7. Although illustration is omitted, description has been given that the bottom wall of the second housing chamber 2 may have the drain hole that communicates the first housing chamber 1 and the outside of the case 10. However, the present disclosure is not limited to these forms, and the bottom wall (no reference numeral) of the second housing chamber 2 may have a drain hole (not shown) that communicates the second housing chamber 2 and the outside of the case 10. A drain plug is also inserted into and removably fixed to this drain hole. As described above with reference to FIG. 5 etc., the oil flow from the second housing chamber 2 to the first housing chamber 1 is restricted by the valve body 6 provided to the opening 5 formed between the first housing chamber 1 and the second housing chamber. Since the oil flow from the first housing chamber 1 to the second housing chamber 2 is not restricted by the valve body 6, the oil flows from the first housing chamber 1 to the second housing chamber 2 via the opening 5. That is, the drain hole formed in the bottom wall of the second housing chamber 2 also serves as a drain hole that communicates the first housing chamber 1 and the outside of the case 10. Thus, the oil inside the case 10 can appropriately be drained from the first housing chamber 1 and the second housing chamber 2 via the drain hole formed at a low position in the case 10 with the vehicle drive device 100 mounted on the vehicle.

Summary of Embodiment

Hereinafter, a brief summary of the vehicle drive device (100) described above will be provided.

In one aspect, the vehicle drive device (100) is a vehicle drive device (100) including a rotary electric machine (MG) that is a driving force source for a wheel (W), an output member (OUT) drivingly connected to the wheel (W), a gear mechanism (TA) that drivingly connects the rotary electric machine (MG) and the output member (OUT), and a case (10) that houses the rotary electric machine (MG) and the gear mechanism (TA), in which the case (10) is partitioned by a partition wall (4) of the case (10) to include a first housing chamber (1) that houses the rotary electric machine (MG) and a second housing chamber (2) that houses the gear mechanism (TA), the gear mechanism (TA) supplies oil to a lubrication target location by scooping up the oil inside the case (10), the partition wall (4) has an opening (5) that communicates the first housing chamber (1) and the second housing chamber (2), and a valve body (6) is attached to the opening (5) so as to allow an oil flow from the first housing chamber (1) to the second housing chamber (2) and restrict an oil flow from the second housing chamber (2) to the first housing chamber (1).

In this configuration, the partition wall that separates the first housing chamber and the second housing chamber has the opening that communicates the first housing chamber and the second housing chamber, and the valve body is attached to the opening so as to allow the oil flow from the first housing chamber to the second housing chamber and restrict the oil flow from the second housing chamber to the first housing chamber. Therefore, the decrease in the oil level in the second housing chamber can be limited even if the oil surface is tilted due to tilt of the vehicle or inertia caused by turn or acceleration and deceleration. That is, even if the oil surface is tilted, the gear mechanism housed in the second housing chamber can supply the oil to the lubrication target location by scooping up the oil inside the case. With this configuration, it is possible to provide the vehicle drive device in which the bias of the oil toward any one of the plurality of housing chambers formed in the case is suppressed.

It is preferable that the vehicle drive device (100) include an oil pump that supplies the oil to the rotary electric machine (MG), and a strainer that removes impurities from the oil sucked by the oil pump, and the strainer be housed in the second housing chamber (2).

With this configuration, even if the oil surface is tilted, the oil pump can suck the oil to be supplied to the rotary electric machine (MG) via the strainer provided in the second housing chamber (2) where the decrease in the oil level is limited.

In the vehicle drive device (100), it is preferable that a bottom wall (21) of the first housing chamber (1) have a drain hole (7) that communicates the first housing chamber (1) and an outside of the case (10), a drain plug (79) be inserted into and removably fixed to the drain hole (7), and a communication hole (8) be provided to communicate the second housing chamber (2) and the drain hole (7).

By providing such a drain hole (7) and a communication hole (8), the oil housed in the first housing chamber (1) and the second housing chamber (2) can be drained from the single drain hole (7). That is, even if the valve body (6) is attached to the opening (5), when draining the oil, the oil in the second housing chamber (2) can also be drained via the communication hole (8) that communicates the drain hole (7) and the second housing chamber (2). That is, the drain of the oil from the second housing chamber (2) is not hindered by the valve body (6) attached to the opening (5). Compared to a case where oil drain holes (the drain hole (7) in the first housing chamber (1) and a drain hole in the second housing chamber (2) different from the drain hole (7)) are provided in the first housing chamber (1) and the second housing chamber (2), the structure of the case (10) can be simplified and the number of components can be reduced. The drain hole (7) is closed by the drain plug (79), and the oil can be drained from both the first housing chamber (1) and the second housing chamber (2) by simply removing the single drain plug (79). Therefore, It is also possible to increase the efficiency of the oil draining work.

In the vehicle drive device (100), it is preferable that the bottom wall (21) have a second housing chamber facing surface (22) that faces the second housing chamber (2), the communication hole (8) be formed inside the bottom wall (21), and the communication hole (8) include a first opening (81) that is open on a side surface of the drain hole (7), and a second opening (82) that is open on the second housing chamber facing surface (22), and be formed so as to communicate the first opening (81) and the second opening (82).

With this configuration, the drain hole (7) and the communication hole (8) can be provided at low positions in the case (10) with the vehicle drive device (100) mounted on the vehicle. Therefore, the oil inside the case (10) can appropriately be drained via the drain hole (7).

In the vehicle drive device (100), it is preferable that a lower end (Z2) of the first opening (81) be located on a lower side (V2) with respect to an opening (71) of the drain hole (7) on the first housing chamber (1) side.

With this configuration, the oil in the first housing chamber (1) is appropriately drained via the drain hole (7), and the oil in the second housing chamber (2) is appropriately drained via the drain hole (7) and the communication hole (8) connected to a side surface (78) of the drain hole (7) even if the oil flow toward the first housing chamber (1) via the opening (5) is restricted by the valve body (6).

In the vehicle drive device (100), it is preferable that communication between the second housing chamber (2) and the drain hole (7) via the communication hole (8) be blocked in a state in which the drain plug (79) is fixed to the drain hole (7).

With this configuration, in the state in which the drain plug (79) is fixed to the drain hole (7), the drain hole (7) is closed and the communication between the first housing chamber (1) and the outside of the case (10) is blocked. Further, the communication between the second housing chamber (2) and the drain hole (7) via the communication hole (8) is blocked. That is, in the state in which the drain plug (79) is fixed to the drain hole (7), the communication between the first housing chamber (1) and the second housing chamber (2) via the communication hole (8) is blocked as well. Therefore, the oil flow between the first housing chamber (1) and the second housing chamber (2) via the communication hole (8) can be limited in the state in which the drain plug (79) is fixed to the drain hole (7) without draining the oil from the case (10).

In the vehicle drive device (100), it is preferable that a bottom wall of the second housing chamber (2) have a drain hole that communicates the first housing chamber (1) and an outside of the case (10).

Since this drain hole is formed in the bottom wall of the second housing chamber (2), it communicates the first housing chamber (1) and the outside of the case (10), and also communicates the second housing chamber (2) and the outside of the case (10). Thus, the oil inside the case (10) can appropriately be drained from the first housing chamber (1) and the second housing chamber (2) via the drain hole formed at a low position in the case (10) with the vehicle drive device (100) mounted on the vehicle.

DESCRIPTION OF THE REFERENCE NUMERALS

1: first housing chamber, 2: second housing chamber, 4: partition wall, 5: opening, 6: valve body, 7: drain hole, 8: communication hole, 10: case, 21: bottom wall, 22: second housing chamber facing surface, 71: drain opening (opening of drain hole on first housing chamber side), 78: side surface, 79: drain plug, 81: first opening, 82: second opening, 100: vehicle drive device, G: gear, MG: rotary electric machine, OUT: output member, TA: gear mechanism, W: wheel, Z1: drain opening position (position of opening of drain hole on first housing chamber side), Z2: communication lower end position (lower end of second opening)

The invention claimed is:

1. A vehicle drive device comprising:

a rotary electric machine that is a driving force source for a wheel;

an output member drivingly connected to the wheel;

a gear mechanism that drivingly connects the rotary electric machine and the output member; and a case that houses the rotary electric machine and the gear mechanism, wherein the case is partitioned by a partition wall of the case to include a first housing chamber that houses the rotary electric machine and a second housing chamber that houses the gear mechanism, the gear mechanism supplies oil to a lubrication target location by scooping up the oil inside the case, the partition wall has an opening that communicates the first housing chamber and the second housing chamber, and a valve body is attached to the opening so as to allow an oil flow from the first housing chamber to the second housing chamber and restrict an oil flow from the second housing chamber to the first housing chamber, wherein the valve body includes a plate with a pyramidal portion that protrudes toward the first housing chamber.

2. The vehicle drive device according to claim 1, further comprising:

an oil pump that supplies the oil to the rotary electric machine; and a strainer that removes impurities from the oil sucked by the oil pump, wherein the strainer is housed in the second housing chamber.

3. The vehicle drive device according to claim 1, wherein:

a bottom wall of the first housing chamber has a drain hole that communicates the first housing chamber and an outside of the case;

a drain plug is inserted into and removably fixed to the drain hole; and a communication hole is provided to communicate the second housing chamber and the drain hole.

4. The vehicle drive device according to claim 3, wherein:

the bottom wall has a second housing chamber facing surface that faces the second housing chamber;

the communication hole is formed inside the bottom wall; and the communication hole includes a first opening that is open on a side surface of the drain hole, and a second opening that is open on the second housing chamber facing surface, and is formed so as to communicate the first opening and the second opening.

5. The vehicle drive device according to claim 4, wherein a lower end of the first opening is located on a lower side with respect to an opening of the drain hole on the first housing chamber side.

6. The vehicle drive device according to claim 3, wherein communication between the second housing chamber and the drain hole via the communication hole is blocked in a state in which the drain plug is fixed to the drain hole.

7. The vehicle drive device according to claim 1, wherein a bottom wall of the first housing chamber has a drain hole that communicates the first housing chamber and an outside of the case.

8. The vehicle drive device according to claim 1, wherein:
- the valve body includes:
  - the plate that has a larger area than the opening,
  - a fixed portion that is fixed to the partition wall,
  - a hinge portion that connects the plate to the fixed portion and is structured to allow the plate to rotate relative to the fixed portion, and
  - the pyramidal portion that is formed at a center of the plate and that protrudes toward the first housing chamber, and
- the valve body is structured such that the plate is separated from the partition wall and the opening is thus open when the vehicle drive device has a horizontal posture.

* * * * *